United States Patent [19]

Lee

[11] Patent Number: 5,174,406

[45] Date of Patent: Dec. 29, 1992

[54] ENGINE AIR DEFLECTOR

[75] Inventor: Michael C. Lee, Beaver Dam, Wis.

[73] Assignee: Deere & Company, Moline, Ill.

[21] Appl. No.: 738,964

[22] Filed: Aug. 1, 1991

[51] Int. Cl.⁵ .............................................. B60K 11/00
[52] U.S. Cl. ................................ 180/68.2; 123/41.31;
180/68.1; 280/755
[58] Field of Search ............................ 180/68.1, 68.2;
280/755, 757, 758, 759; 123/41.31, 41.7, 41.56;
56/12.2, 12.8; 181/213, 214, 141, 283

[56] References Cited

U.S. PATENT DOCUMENTS

| | | | |
|---|---|---|---|
| 3,987,766 | 10/1976 | Welck | 123/41.66 |
| 4,432,309 | 2/1984 | Hutchison et al. | 123/41.66 |
| 4,741,411 | 5/1988 | Stricker | 181/283 |
| 4,891,940 | 1/1990 | Tamba et al. | 180/68.1 |
| 4,917,201 | 4/1990 | Fujikawa et al. | 180/68.2 |
| 4,940,100 | 7/1990 | Ueda | 123/41.31 |
| 5,029,668 | 7/1991 | Murakawa et al. | 181/240 |

FOREIGN PATENT DOCUMENTS 1161921 8/1969 United Kingdom ................ 280/755

Primary Examiner—Eric D. Culbreth

[57] ABSTRACT

A cooling system air deflector positioned within an engine enclosure for deflecting cooling system outlet air away from a plastic grille and onto a muffler positioned within the enclosure. Ballast weights are positioned to then deflect the air out of the enclosure through the opening that is spaced from the grille.

18 Claims, 4 Drawing Sheets

ENGINE AIR DEFLECTOR

BACKGROUND OF THE INVENTION

1. Field of the Invention:

The invention relates to powered vehicles that direct cooling system outlet air onto the exterior surface of a muffler enclosed within an enclosure or hood.

2. Description of the Related Art:

Conventional vehicles such as lawn and garden tractors are provided with a power source such as an engine or motor, and a cooling system for preventing the power source from overheating. Mufflers are provided for deadening the sound of the engine. It is known to provide hoods for enclosing the engine, cooling system and muffler. However, heat can build up within the hood since the hot muffler, whose exterior surface can reach 700° C., is positioned inside the hood. This buildup of heat can cause the carburetor to experience "vapor lock" and malfunction, or cause the engine to overheat.

Such conventional vehicles fall generally within two categories. The first category provides a water-cooled system, and the second category provides an air-cooled system.

Water cooled systems utilize cool air drawn in from outside the hood to cool a supply of water, and the water then cools the engine. The air that has become warmed within the cooling system is then discharged through an outlet into the chamber of the hood. The outlets of water-cooled systems are typically positioned above the engine. Many vehicles having water-cooled engines allow the cooling system outlet air, which is typically 60° C., to exit the hood through a grille. The mufflers on these vehicles are often partially exposed and not entirely confined within the hood. The mufflers are thereby cooled by the exposure to outside air. However, many such mowers allow the heat created by the exterior surface of the muffler to otherwise accumulate within the hood. Therefore, the heat can back up toward the carburetor and cause engine failure. Further, since many of these mufflers are at least partially exposed, there is a greater likelihood that a bystander could be harmed by contact with the hot exterior surface of the muffler.

The second category of vehicles are air-cooled. Air is drawn in from outside of the hood and used to directly cool the engine. Once warmed by the engine, the warm cooling system air is discharged through an outlet and into the chamber defined by the hood. Air-cooled system outlets are typically located beneath the engine. It is known to deflect this outlet air upwardly toward the muffler and through a grille. Since the air gets very hot as it passes over the muffler, the grille through which the hot air travels must be capable of withstanding high temperatures. Therefore, such grilles have been made of a variety of metals or aluminum, and are relatively costly to manufacture and install. Plastic grilles are generally not capable of withstanding the high temperatures created by the air that has passed over the muffler.

Conventional grilles also serve as a passage through which ambient air can enter and exit so that the engine compartment is further cooled. Typical grilles prevent operators and bystanders from reaching inside of the enclosure and being harmed by the hot power source components or the muffler. The grilles further prevent branches and other obstacles from entering the enclosure and damaging power source components.

Typical vehicles within both of the above categories direct the air upwardly through the grille such that the hot air does not contact the ground. This prevents scorching or damaging the grass or vegetation.

Many small vehicles are manufactured having ballast weights attached to the frame of the vehicle. These weights act to generally enhance the balance of the vehicle when implements are attached.

Therefore, it would be desirable to provide a powered vehicle with a muffler contained within an engine enclosure, and a mechanism for directing cooling system outlet air across the exterior surface of the muffler. It would also be desirable to provide a mechanism for directing the air that has passed over the muffler out of the enclosure through an opening other than the grille, such that the grille is not subjected to high temperatures. The grille could thereby be made out of a plastic material that is more attractive and relatively inexpensive to manufacture. It would be desirable for the opening to be shaped and positioned in such a way that it would be difficult for a person to reach into the opening and be burned by the muffler or engine components. It would be desirable for such a mechanism to be simple and compact in construction, and to utilize components already included on the vehicle that have other functions, such that a separate more costly conduit structure is not required. It would also be desirable for such a mechanism to be relatively compact such that it is compatible with an engine enclosure within which there is only a limited amount of space. Further, it would be desirable for such a mechanism to direct the air out of the enclosure with a horizontal or upward trajectory such that vegetation beneath the vehicle is not damaged.

SUMMARY OF THE INVENTION

The preferred embodiment of the present invention provides a vehicle having an enclosure within which is contained a power source, a power source cooling system, and a muffler. A deflector is provided for directing or channeling at least a portion of the cooling system outlet air onto the muffler. A ballast weight having a heat shield is positioned adjacent the muffler to deflect air that has passed over the muffler through an opening in the enclosure with a horizontal trajectory. The opening is relatively narrow and spaced far enough from the muffler and power source that it would be difficult for a person to reach through the opening and be injured by the hot muffler or power source components. A grille spaced from the opening is made of a plastic material and allows air to enter and exit the enclosure.

The present invention therefore provides a means for preventing a muffler from heating the interior of an enclosure to a point where the engine will overheat. Also, a grille is provided that allows air to pass into and out of the enclosure such that the engine is further cooled. Since the air is directed away from the grille, the grille can be made of a plastic material that is more attractive and less costly to manufacture than metal grilles. The use of a ballast weight to deflect the air out of the enclosure acts to prevent the air from striking the ground and burning or otherwise damaging vegetation beneath the vehicle. Also, the use of a ballast weight to serve as an air deflector simplifies the mechanism and reduces the number of additional parts required. The configuration of the various parts in the confined space within the enclosure according to the present invention therefore forms a conduit mechanism that is simpler and less expensive to manufacture and assemble than more elaborate tubing or duct-work structures. It is also compact such that it occupies little space within the enclosure.

DESCRIPTION OF THE PREFERRED EMBODIMENT

Figure 1:
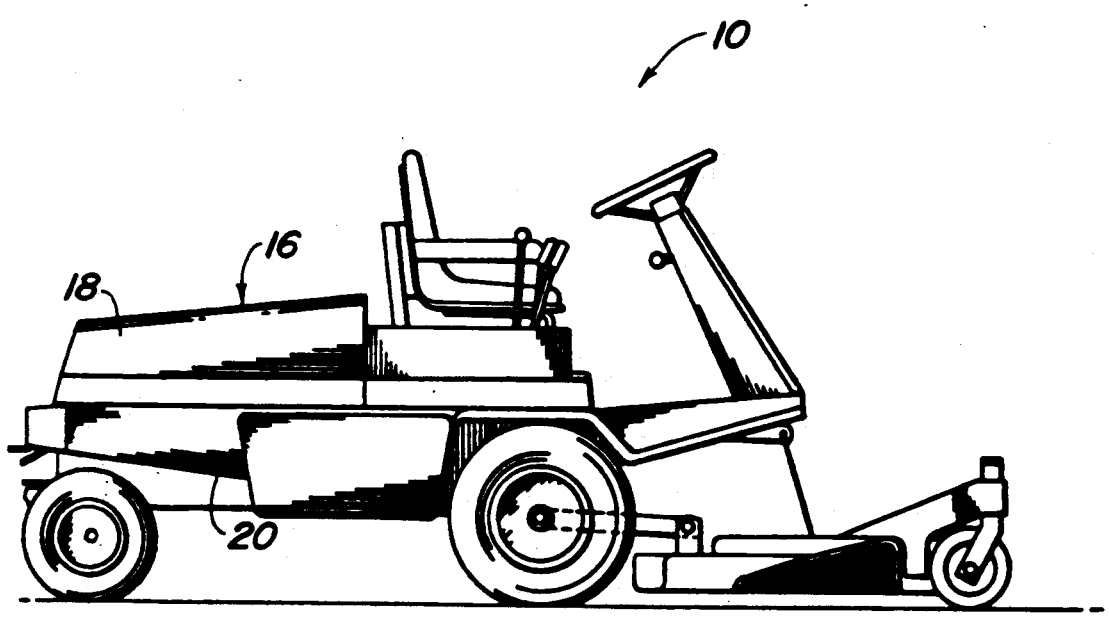
FIG. 1 shows a front mounted mowing vehicle with which the present invention may be used, and having its engine mounted on the rear of the vehicle.
Figure 2:
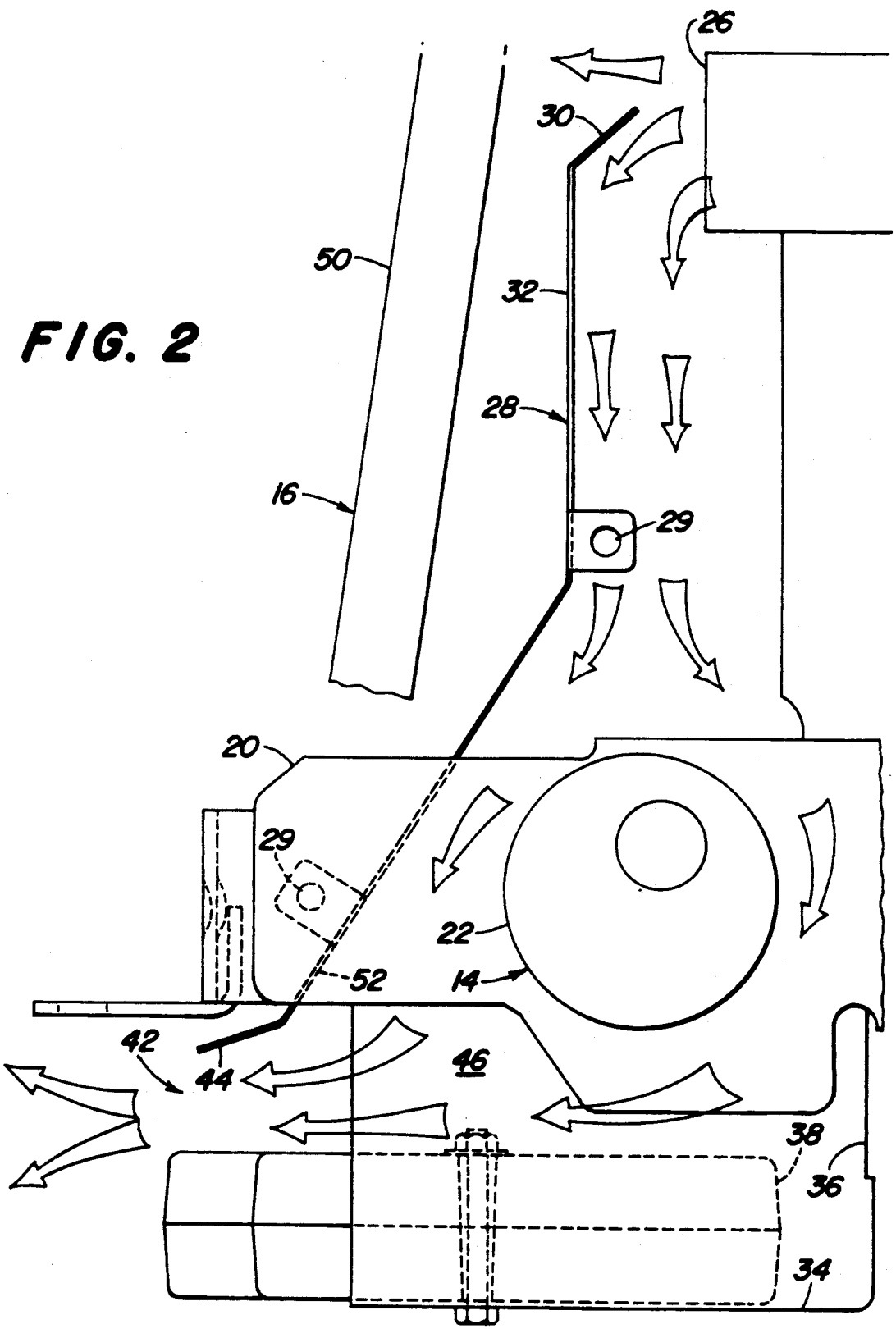
FIG. 2 is a sectional side elevation view of the rear of a vehicle as seen in FIG. 1, and including a first embodiment of the present invention adapted for use with a water cooled engine.

Referring now to FIG. 1, there is shown a front mounted mower vehicle 10 for use in the cutting of vegetation. According to the preferred embodiment of the present invention, the vehicle 10 is provided with a power source such as an engine 12, and a muffler 14 that are contained within an enclosure 16 at the rear of the vehicle 10. A plurality of components serve to define the engine enclosure, including a hood 18, and the vehicle frame 20. The enclosure 16 serves to at least partially contain the noise of the engine 12 during operation and also to protect the contents of the enclosure 16 from being damaged by contact with obstacles. The enclosure 16 also acts to prevent or make it difficult for a person to be harmed or burned by contact with the engine 12 or muffler 14. The engine 12 is provided with a cooling system for maintaining the engine 12 within a range of permissible operating temperatures. The cooling system has an inlet for drawing in relatively cool air, and an outlet 26 through which relatively warm air exits, as seen in FIG. 2. A muffler 14 having a body 22 and an exterior surface is positioned within the enclosure 16.

Referring now to FIG. 2, an embodiment of the present invention provides a channeling or conduit mechanism for directing the cooling system outlet air across the exterior surface of the muffler and out of the enclosure 16. An air deflector 28 is coupled to the vehicle frame 20 via bolts 29 and is positioned adjacent the cooling system outlet 26 for directing a portion of the air downwardly toward the muffler body 22. The upper edge portion 30 of the deflector 28 is diagonally disposed to deflect the cooling system outlet air downwardly. The deflector 28 includes a generally vertical portion 32 that serves to contain the air as it travels downwardly toward the muffler 14.

Figure 3:
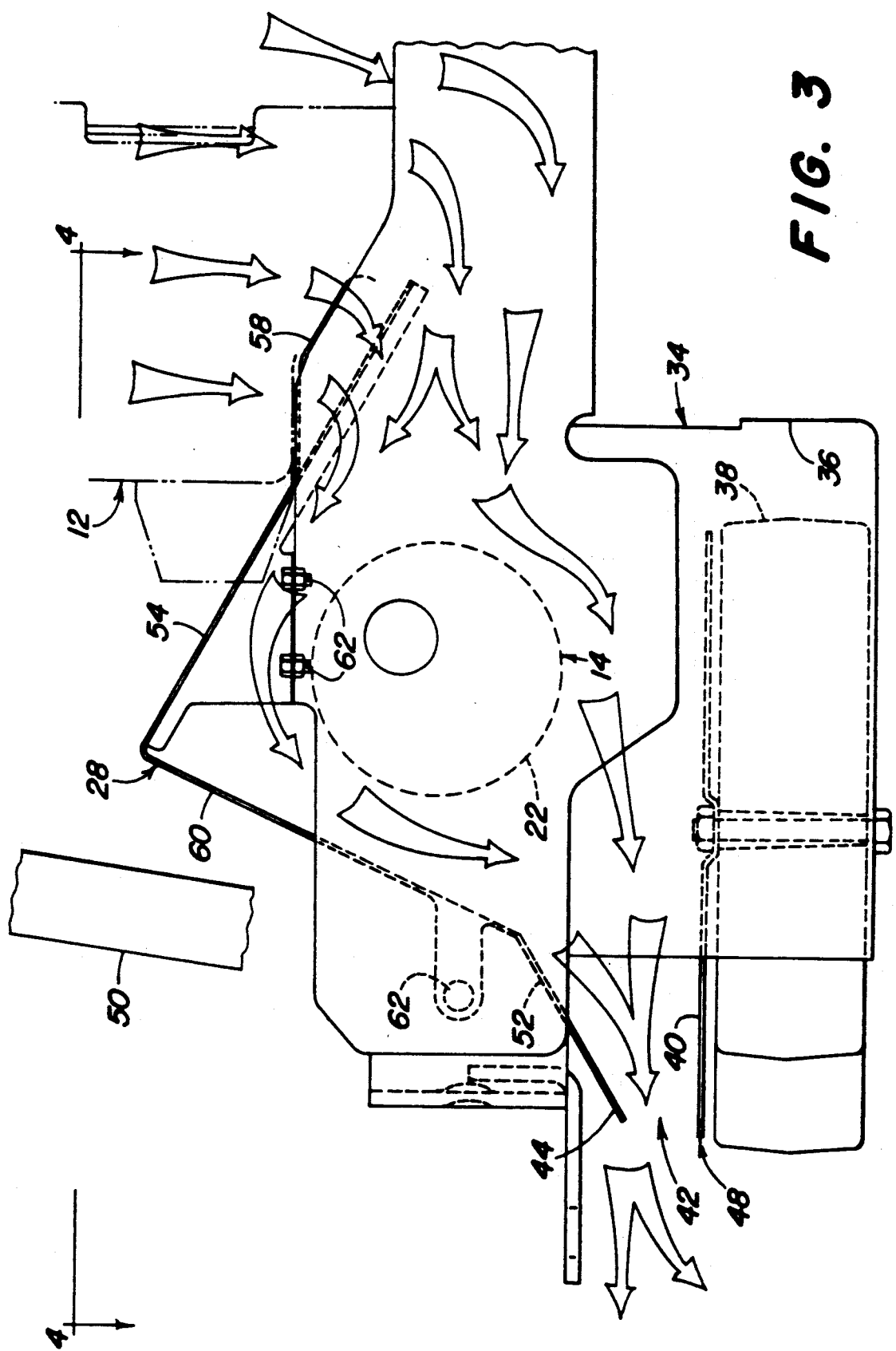
FIG. 3 is a sectional side elevation view of the rear of a vehicle as shown in FIG. 1 and including a second embodiment of the present invention adapted for use with an air cooled engine.

A weight tray 34 having a back portion 36 is rigidly coupled to the frame 20 of the vehicle and a ballast weight 38 is bolted to the tray 34. The ballast weight 38 is positioned generally horizontally beneath the muffler 14. The present invention can be provided with a heat shield 40, as seen in FIG. 3, fixed to the top of the ballast weight 38 in a generally horizontal position such that the heat shield 40 is spaced a short distance from the surface of the ballast weight 38. Once the air passes over the exterior surface of the muffler 14, it strikes the heat shield 40 and is directed with a generally horizontal trajectory through an opening 42 in the enclosure structure. The deflector 28 defines the upper portion 44 of the opening 42 according to the preferred embodiment, the tray 34 defines the sides 46, and the heat shield 40 and ballast weight 38 define the bottom 48 of the opening 42.

The present invention provides a grille 50 that is coupled with the hood 18 and defines the rear wall of the enclosure 16. The grille 50 according to the preferred embodiment is made of a plastic material.

Next, the operation of the present invention will be discussed. The embodiment shown in FIGS. 2 and 3 illustrate the present invention in use with a typical water-cooled system. During normal operation, the power source cooling system draws air into the enclosure 16 and into the cooling system inlet. Once in the cooling system, the air acts to cool a supply of water circulating within the cooling system. This water then cools the engine 12 to keep it within a desirable range of operating temperatures. Once the water transfers the heat of the engine 12 to the air in the cooling system, the air then exits the cooling system by passing through the outlet 26 at the top of the engine with a rearward trajectory. A portion of this exit air travels rearwardly over the top of the deflector 28 and exits the enclosure 16 by passing through the plastic grille 50 that forms the back wall of the hood 18. The remainder of the cooling system outlet air strikes the deflector 28 and is thereby directed downwardly and away from the grille 50. This air then comes in contact with and passes over the exterior surface of the muffler body 22. The heat of the muffler 14 is transferred to and carried away by the air passing over the muffler 14. The air is blocked from traveling forwardly within the enclosure 16 due to the presence of the body of the engine 12. The lower portion 52 of the deflector 28 is positioned between the muffler 14 and the grille 50 and acts to block air from rising up into the grille 50 once it has passed over the muffler 14.

The air therefore continues to travel downwardly toward the ballast weight 38 according to the embodiment shown in FIG. 2. Once the air strikes the ballast weight 38, it is prevented from traveling forwardly by the presence of the back portion 36 of the tray 34 and the body of the engine 12. Therefore, the air is directed rearwardly through the opening 42. The surface of the ballast weight 38 that the air strikes is disposed horizontally, thereby directing the air through the opening 42 in a generally horizontal fashion. The air remains relatively hot as it passes through the opening 42, and will therefore rise once it enters the atmosphere outside the enclosure 16. The air leaving the enclosure 16 will therefore not strike or damage the ground upon leaving the enclosure 16.

The conduit structure described above is thereby formed by the various components within the enclosure 16, and acts to direct cooling system outlet air away from the grille 50, downwardly over the muffler 14, and rearwardly out the opening 42 in the enclosure 16. The deflector 28 according to the preferred embodiment acts as the rear wall of the conduit. The body of the engine 12 and the back portion 36 of the weight tray 34 act as the front wall of the conduit, and the sides of the hood 18 serve as the vertical side walls. The ballast weight 38 forms the bottom wall of the conduit. This conduit structure acts as a compact mechanism for generally confining and directing the cooling system exit air. The conduit structure is defined by various vehicle components to thereby provide a simple structure. The use of pre-existing parts is advantageous for applications having limited space within the hood enclosure.

The opening 42 according to the present invention is located low on the rear of the vehicle 10. This remote location makes it less likely that a person could reach through the opening 42 toward the hot muffler 14 and be injured. Also, the narrow shape of the opening 42 makes such an occurrence even less likely. The remote location and narrow configuration of the opening also reduces the possibility that branches or other foreign materials will enter the enclosure through the opening 42.

The embodiment described above involves the use of a water-cooled engine. Cooling systems that utilize water as the cooling medium typically discharge the air from the cooling system from above the engine. Therefore, the embodiment described above deflects air from near the top of the engine 12, and directs it downwardly toward the muffler 14. However, small engines having air-cooled systems typically discharge air from beneath the engine. An alternative embodiment of the present invention is shown in FIGS. 3 and 4, and accommodates an air-cooled system that discharges air from beneath the engine.

Figure 4:
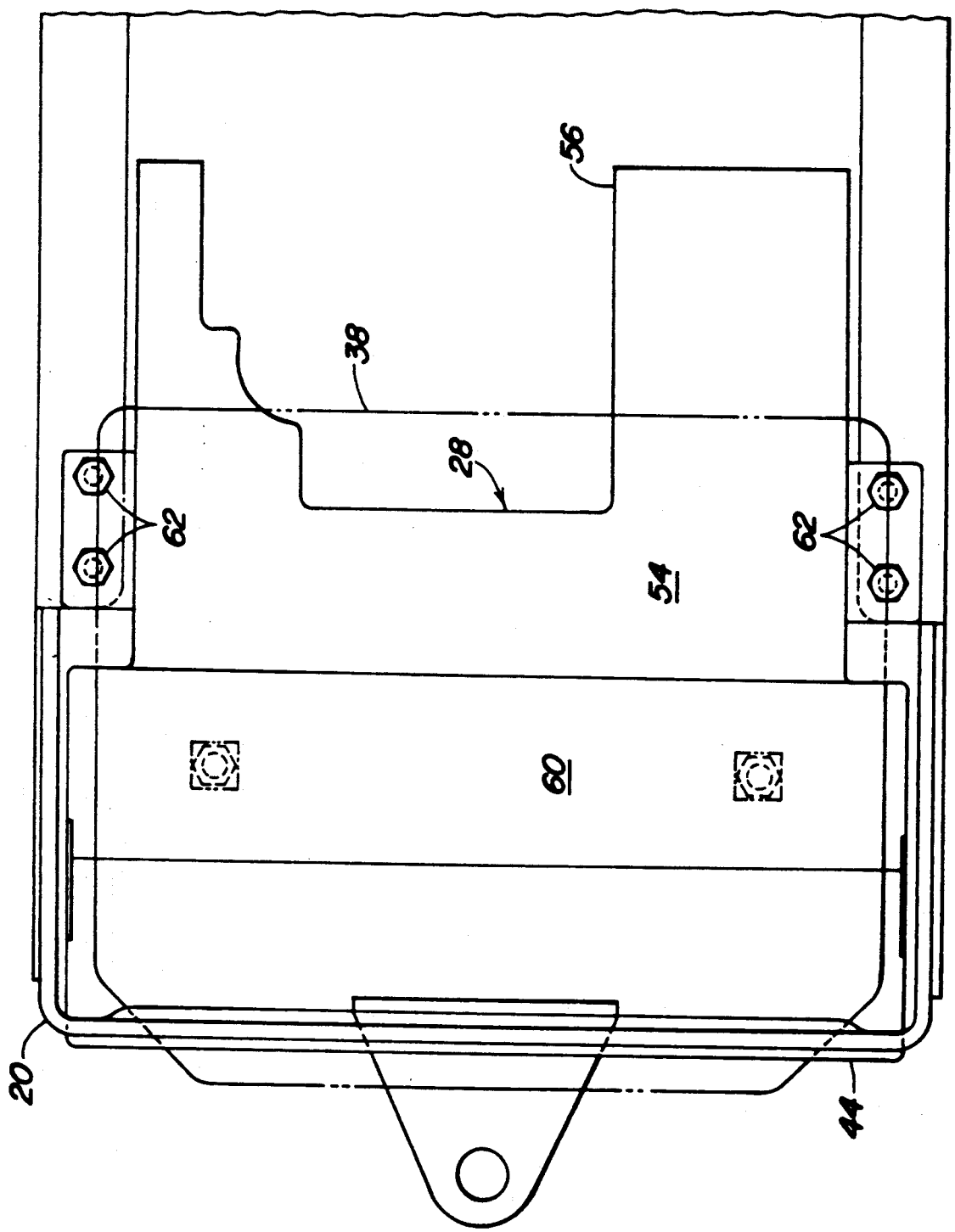
FIG. 4 is a partial plan view of the second embodiment of the present invention shown in FIG. 3, which is adapted for use with an air cooled engine. The deflector, ballast weight and frame are shown, and the engine and muffler are not shown for the purpose of clarity.

As in the embodiment shown in FIG. 2, the embodiment shown in FIGS. 3 and 4 allows the cooling system exit air to pass over the exterior surface of the muffler 14 to cool it and carry away heat. The deflector 28 of the alternative embodiment has a first portion 54 that defines a notch 56 having the same general shape as the side of the engine 12. The deflector 28 is positioned directly behind the engine 12 such engine 12 is situated within the notch 56. The deflector 28 therefore acts to wrap around the side of the engine 12. The air is discharged from the cooling system from beneath the engine 12 and within notch 56. The exiting cooling air travels downwardly through the notch 56 and rearwardly toward the muffler 14. Vertical side baffles 58 coupled to the deflector 28 act to confine this downward flow of air.

Once the air exits the cooling system, the air is prevented from traveling forwardly within the enclosure 16 by the presence of the engine body and the vehicle frame 20. Instead of moving forwardly, the air flows rearwardly and passes around the exterior surface of the muffler 14. The first portion 54 of the deflector 28 is spaced from the muffler 14 such that the cooling system outlet air is allowed to strike the muffler 14 but is blocked from rising up toward the carburetor. A second portion 60 is positioned between the muffler 14 and the grille 50 and serves to block the air from reaching the grille 50 once it has passed over the muffler 14. The second portion 60 also acts to direct the air downwardly toward the opening 42. Once the air has traveled around the muffler 14 it travels downwardly toward the heat shield 40 and ballast weight 38. Since the surface of the heat shield 40 is disposed horizontally, the air will be deflected rearwardly through the opening 42 with a horizontal trajectory. Bolts 62 couple the deflector to the frame 20 of the vehicle 10.

The heat shield 40 of the present invention is coupled to the ballast weight 38 and acts to direct the air rearwardly and horizontally through the opening 42 once the air has passed over the muffler 14. The air strikes the heat shield 40 and transfers heat thereto. The ballast weight 38 is thereby shielded from the air and associated heat. The weight 38 does receive heat via the heat shield 40, but does not achieve the temperatures it would if the heat shield 40 were not present. Since the heat shield 40 is relatively thin, it cools relatively rapidly after the engine 12 has been shut off. The ballast weight 38, on the other hand, is relatively thick and would retain heat for a significantly longer period of time than the heat shield 40. Since the ballast weight 38 stays cooler due to the heat shield 40, and the thin heat shield 40 cools quickly after the engine 12 is shut off, the present invention may reduce the risk of a bystander or operator being burned by touching the ballast weight 38 or heat shield 40 after the engine 12 has been shut off.

The present invention provides a conduit through which cooling system outlet air is directed over the muffler 14 and through the opening 42 without allowing the air that has passed over the muffler 14 to rise up into the grille 50. The invention thereby facilitates the use of a plastic grille 50 that is less costly and more attractive than metal grilles, since the grille 50 of the present invention is not subjected to air having excessively high temperatures.

I claim:

1. A powered vehicle, comprising:
   a power source for powering the vehicle;
   a cooling system for cooling the power source, and having an outlet through which outlet air exits;
   an exhaust muffler coupled with the power source, and having an exterior surface;
   an enclosure within which is contained the power source, cooling system and muffler;
   a grille forming a portion of the enclosure for allowing ambient air to pass into and out of the enclosure;
   a deflector positioned within the enclosure for channeling at least a portion of the outlet air onto the exterior surface of the muffler, a portion of said deflector being positioned between the muffler and the grille for blocking the air that has passed over the exterior surface of the muffler from flowing through the grille;
   the enclosure defining an opening spaced from the grille, and through which the air that has passed over the muffler exits the enclosure; and
   at least one ballast weight positioned adjacent the muffler for deflecting air that has passed over the muffler through the opening in a generally horizontal direction.

2. The invention of claim 1, wherein the grille further comprises a plastic material.

3. The invention of claim 1, wherein the opening is sufficiently narrow and spaced from the muffler to generally block a person's extremities from passing through the opening and touching the muffler.

4. The invention of claim 1, wherein:
   the deflector is a metal plate positioned between the cooling system air outlet and the grille for deflecting at least a portion of the outlet air away from the grille and onto the exterior surface of the muffler; and
   the ballast weight is disposed generally horizontally and adjacent the muffler for deflecting the air through the opening in a generally horizontal direction.

5. The invention of claim 4, and further comprising:
a shield coupled to the ballast weight for blocking the air that has passed over the exterior surface of the muffler from striking the ballast weight, said shield being disposed generally horizontally for directing the air rearwardly through the opening with a horizontal trajectory.

6. The invention of claim 1, wherein:
the deflector, engine, and ballast weight form a conduit within the enclosure, and through which the cooling system outlet air travels;
the muffler is positioned within said conduit; and
the deflector and ballast weight define an opening in the conduit through which the air passes to exit the enclosure.

7. The invention of claim 6, wherein:
the ballast weight is positioned generally horizontally and proximate the muffler for deflecting the air rearwardly through the opening with a generally horizontal trajectory.

8. The invention of claim 7, and further comprising a shield coupled with the ballast weight for blocking the air that has passed over the exterior surface of the muffler from striking the ballast weight, said shield being disposed generally horizontally for directing the air rearwardly through the opening with a horizontal trajectory.

9. The invention of claim 8, wherein the shield further comprises:
a thin plate-like member, said member having an air blocking portion spaced from the ballast weight for generally hindering heat from being transmitted from the shield to the ballast weight.

10. The invention of claim 6, wherein:
the cooling system outlet is located near the top of the engine, and discharges relatively warm air rearwardly;
the deflector is positioned to the rear of the cooling system outlet and deflects at least a portion of the outlet air downwardly and away from the grille, said deflector forming a rearward and generally vertical wall of the conduit; and
said ballast weight acts as a bottom wall of said conduit, and is disposed generally horizontally for deflecting the air within the conduit rearwardly through the opening with a generally horizontal trajectory.

11. The invention of claim 10, and further comprising a shield coupled to the ballast weight for blocking the air that has passed over the exterior surface of the muffler from striking the ballast weight, said shield being disposed generally horizontally for directing the air rearwardly through the opening with a horizontal trajectory.

12. The invention of claim 11, wherein the shield further comprises:
a thin plate-like member, said member having an air blocking portion spaced from the ballast weight for generally hindering heat from being transmitted from the shield to the ballast weight.

13. The invention of claim 6, wherein:
the cooling system outlet is located near the bottom of the engine, and discharges relatively warm air therethrough;
the deflector is positioned to the rear of the cooling system outlet and defines an upper wall of the conduit; and
the ballast weight defines a bottom wall of said conduit, and disposed generally horizontally for deflecting the air within the conduit rearwardly through the opening with a horizontal trajectory.

14. The invention of claim 1, and further comprising a shield coupled to the ballast weight for blocking the air that has passed over the exterior surface of the muffler from striking the ballast weight, said shield being disposed generally horizontally for directing the air rearwardly through the opening with a horizontal trajectory.

15. A powered vehicle, comprising:
a power source for powering the vehicle;
a cooling system for cooling the power source, and having an outlet through which outlet air exits;
an exhaust muffler coupled with the power source, and having an exterior surface;
an enclosure within which is contained the power source, cooling system and muffler;
a grille forming a portion of the enclosure for allowing ambient air to pass into and out of the enclosure;
a metallic deflector positioned within the enclosure and between the cooling system outlet and the grille for directing at least a portion of the air exiting the cooling system outlet away from the grille and onto the exterior surface of the exhaust muffler, a portion of said deflector being positioned between the muffler and the grille for blocking the air that has passed over the exterior surface of the muffler from flowing through the grille;
the enclosure defines an opening spaced from the grille, and through which the air that has passed over the exterior surface of the muffler exits the enclosure;
at least one ballast weight operatively carried by the frame and disposed generally horizontally to deflect the air through the opening with a generally horizontal trajectory.

16. The invention of claim 15, and further comprising a shield coupled to the ballast weight for blocking the air that has passed over the exterior surface of the muffler from striking the ballast weight, said shield being disposed generally horizontally for directing the air rearwardly through the opening with a horizontal trajectory.

17. The invention of claim 16, wherein the shield further comprises:
a thin plate-like member, said member having an air blocking portion spaced from the ballast weight generally hindering heat from being transmitted from the shield to the ballast weight.

18. The invention of claim 15, wherein the grille further comprises a plastic material.

* * * * *